(12) United States Patent
Cassidy et al.

(10) Patent No.: US 8,648,122 B2
(45) Date of Patent: Feb. 11, 2014

(54) METHOD OF FOAMING POLYOLEFIN USING ACRYLATED EPOXIDIZED FATTY ACID AND FOAM PRODUCED THEREFROM

(75) Inventors: Edward F. Cassidy, Landrum, SC (US); William J. Mahon, Southbury, CT (US); Natarajan S. Ramesh, Grapevine, TX (US); Parimal M. Vadhar, Greer, SC (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 272 days.

(21) Appl. No.: 13/308,608

(22) Filed: Dec. 1, 2011

(65) Prior Publication Data

US 2013/0143975 A1 Jun. 6, 2013

(51) Int. Cl.
*C08J 9/00* (2006.01)
*C08J 9/12* (2006.01)

(52) U.S. Cl.
CPC ........................................ *C08J 9/12* (2013.01)
USPC ................ 521/97; 521/98; 521/142; 521/143

(58) Field of Classification Search
None
See application file for complete search history.

(56) References Cited

U.S. PATENT DOCUMENTS

| | | | |
|---|---|---|---|
| 4,965,136 A | 10/1990 | Mueller | |
| 5,089,533 A | 2/1992 | Park | |
| 6,713,522 B2 | 3/2004 | Zhang et al. | |
| 7,846,987 B2 | 12/2010 | Handa | |
| 2005/0138891 A1 | 6/2005 | Wool et al. | |
| 2005/0239915 A1 | 10/2005 | Provan | |
| 2006/0063850 A1 | 3/2006 | Kanae et al. | |
| 2009/0029143 A1 | 1/2009 | Kanae et al. | |
| 2009/0270525 A1 | 10/2009 | Yamamoto et al. | |
| 2009/0275715 A1 * | 11/2009 | Boyles et al. | 526/208 |
| 2010/0215942 A1 | 8/2010 | Casati et al. | |
| 2012/0295993 A1 * | 11/2012 | Wool | 521/50.5 |

FOREIGN PATENT DOCUMENTS

| | | |
|---|---|---|
| EP | 0781807 A2 | 7/1997 |
| EP | 1153974 A1 | 11/2001 |
| WO | 2008103012 A1 | 8/2006 |

OTHER PUBLICATIONS

Bonnaillie and Wool Fabrication of Structural Foams From Soybean Oil. Formulation, Univ. of Delaware. 2004. 1 page.
Bonnaillie and Wool, Thermosetting Foam with a High Bio-Based Content from Acrylated Epoxidized Soybean Oil and Carbon Dioxide, published online Apr. 9, 2007 (www.interscience.wiley.com), 11 pages.
Wool and Knot, Bio-Based Resins and Natural Fibers, ASM International, 11 pages.

\* cited by examiner

*Primary Examiner* — Irina S Zemel
(74) *Attorney, Agent, or Firm* — Ashley D. Wilson

(57) ABSTRACT

The presently disclosed subject matter relates generally to method of producing thermoplastic foam from a blend of polyolefin and acrylated epoxidized fatty acid using a phsyical blowing agent. Specifically, the presently disclosed subject matter includes embodiments wherein the acrylated epoxidized fatty acid is added to the polyolefin resin in an amount of from about 0.1% to about 10%, based on the total weight of the resin. The presently disclosed subject matter also includes the foam produced by the disclosed method.

15 Claims, 15 Drawing Sheets

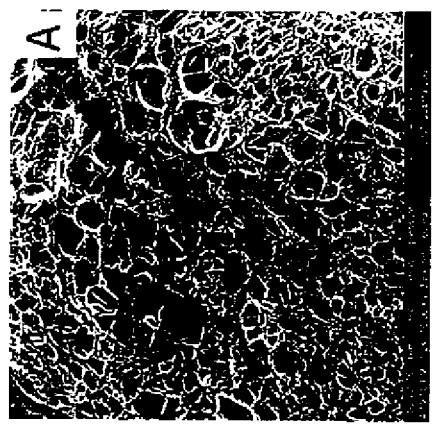

METHOD OF FOAMING POLYOLEFIN USING ACRYLATED EPOXIDIZED FATTY ACID AND FOAM PRODUCED THEREFROM

FIELD OF THE INVENTION

The presently disclosed subject matter relates generally to methods of constructing polyolefin foams using environmentally benign blowing agents, and to the foams produced using the disclosed methods. Particularly, the presently disclosed subject matter relates to methods of foaming polyolefin (such as low density polyethylene) by blending with at least one acrylated epoxidized fatty acid. The foams are produced using at least one physical blowing agent (such as carbon dioxide).

BACKGROUND

Polyolefin foams and methods of manufacturing polyolefin foam rods, planks, and sheets are well known in the art. See, e.g., U.S. Pat. Nos. 5,462,974 and 5,667,728, the entire disclosures of which are incorporated herein by reference. One of the most common polyolefins used to produce foam is polyethylene and, specifically, low density polyethylene (LOPE). While LDPE possesses a number of beneficial physical and chemical properties when used to produce a foamed product, one disadvantage is that the physical blowing agents commonly used (hydrocarbons, chlorinated hydrocarbons, hydrochlorofluorocarbons, hydrofluorocarbons, or combinations thereof) can lead to the formation of smog, have high ozone depletion potential or global warming potential, and/or can be hazardous air pollutants. Further, the long curing process and flammability associated with hydrocarbons have generated a new interest in the development of new technologies to utilize non-flammable physical blowing agents such as carbon dioxide and nitrogen. Thus, the use of hydrocarbons and halogenated hydrocarbon blowing agents for preparing polymeric foams is not preferred environmentally and imposes many limitations on the manufacturing process, thus complicating and significantly increasing the cost of manufacture.

However, polyolefin traditionally does not exhibit favorable foaming behavior when physical blowing agents (such as carbon dioxide) are used. Particularly, when used as a physical blowing agent in traditional polyolefin (such as LPDE) foam processes, carbon dioxide produces non-descript masses of polymeric material or otherwise poor quality thermoplastic foams that collapse. It is believed that the lack of polymer-gas compatibility and limited solubility of carbon dioxide within the molten thermoplastic extrudate lead to the production of an uncontrollably high level of open cells in the foam structure as the thermoplastic/blowing agent combination exits the die. Additionally, even if the resultant foams have a visible foam structure, they tend to collapse quickly due to the relatively high permeability of carbon dioxide relative to air (i.e., the cells can collapse due to the partial vacuum created by the rapid escape of the carbon dioxide from the cells) and become useless for most practical applications within 24 hours of manufacture.

The presently disclosed subject matter is directed to a method of foaming polyolefin using a physical blowing agent. Specifically, when the polyolefin is blended with an acrylated epoxidized fatty acid (such as acrylated epoxidized soybean oil) and a physical blowing agent (such as carbon dioxide) is used, the foamability of the polyolefin dramatically increases.

SUMMARY

In some embodiments, the presently disclosed subject matter is directed to a method of constructing a polyolefin foam, said method comprising blending (1) about 91-99.9% polyolefin and (2) about 0.1-9% acrylated epoxidized fatty acid, where the weight percentages are based on the total amount of (1) and (2) in the blend. The method also comprises mixing a physical blowing agent with the blend and causing the blowing agent to expand within the mixture, thereby forming a foam. In some embodiments, the foam has a density of 0.1 to 9 pounds per cubic foot.

In some embodiments, the presently disclosed subject matter is directed to a foam comprising a blend of about 91-99.9% polyolefin and about 0.1-9% acrylated epoxidized fatty acid, where the weight percentages are based on the total amount of polyolefin and acrylated epoxidized fatty acid in the blend.

BRIEF DESCRIPTION OF THE DRAWINGS

FIGS. 4a-4f illustrate environmental scanning electron microscopy photographs of LDPE, LDPE+2% AESO, and LDPE+5% AESO foamed samples.

DETAILED DESCRIPTION

I. General Considerations

Figure 1:
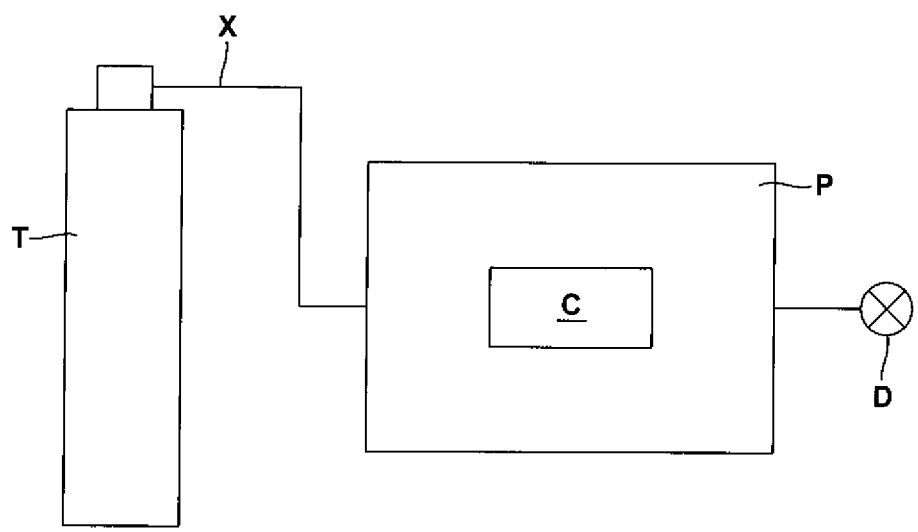
FIG. 1 is a schematic representation of a batch foaming process used in accordance with some embodiments of the presently disclosed subject matter.

The presently disclosed subject matter will be described more fully hereinafter with reference to the accompanying drawings in which some, but not all, embodiments are shown. Indeed, the presently disclosed subject matter can be embodied in many different forms and should not be construed as limited to the embodiments set forth herein. Rather, the disclosed embodiments are provided so that the instant disclosure will satisfy applicable legal requirements.

As set forth in more detail herein below, it has been surprisingly discovered that the addition of an acrylated epoxidized fatty acid (such as acrylated epoxidized soybean oil) to a polyolefin (such as low density polyethylene) dramatically increases the foamability of the polyolefin resin when a physical blowing agent (such as carbon dioxide) is used. Specifically, the presently disclosed subject matter includes embodiments wherein the acrylated epoxidized fatty acid is added to the polyolefin resin in an amount of from about 0.1% to about 10%, based on the total weight of the resin.

II. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long standing patent law convention, the terms "a", "an", and "the" refer to "one or more" when used in the subject application, including the claims. Thus, for example, reference to "a foam" includes a plurality of such foams, and so forth.

Unless indicated otherwise, all numbers expressing quantities of components, reaction conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, percentage, and the like can encompass variations of, and in some embodiments, ±20%, in some embodiments ±10%, in some embodiments ±5%, in some embodiments ±1%, in some embodiments ±0.5%, and in some embodiments ±0.1%, from the specified amount, as such variations are appropriated in the disclosed package and methods.

The term "acrylated" as used herein refers to monoacrylated, monomethacrylated, multi-acrylated, and/or multi-methacrylated monomers, oligomers, and polymers. The term also can include not only pendant groups based on esters of acrylic acid, but also acrylamides, methacrylates, and crotonates.

The term "blowing agent" as used herein refers to any of a wide variety of substances that alone or in combination with at least one other substance is capable of producing a cellular structure in a plastic mass. Thus, the term includes (but is not limited to) gases that expand when pressure is released, soluble solids that leave pores when leached out, liquids that develop cells when they change to gases, and/or chemical agents that decompose or react under the influence of heat to form a gas.

The term "fatty acid" as used herein refers to long-chain aliphatic acids (alkanoic acids) of varying chain lengths.

The term "thermoplastic foam" refers to a cellular polymer wherein numerous gas bubbles or cells are distributed in a polymer matrix that can be repeatedly heated, melted, shaped, and cooled. As a result, thermoplastic foams can be easily melted and recycled. Common examples of thermoplastic foams can include (but are not limited to) polyethylene foam, polystyrene foam, and polypropylene foam).

As used herein, the term "thermoset foam" refers to a cellular polymer wherein numerous gas bubbles or cells are distributed in a polymer matrix that reacts, crosslinks, and hardens into its final stage. As a result, a thermoset foam cannot be easily melted and recycled or reprocessed. An example of a thermoset foam is polyurethane foam.

Although the majority of the above definitions are substantially as understood by those of skill in the art, one or more of the above definitions can be defined hereinabove in a manner differing from the meaning as ordinarily understood by those of skill in the art, due to the particular description herein of the presently disclosed subject matter.

III. The Disclosed Thermoplastic Foam

As set forth herein, the presently disclosed subject matter relates generally to thermoplastic foams produced from a blend of polyolefin and acrylated epoxidized fatty acid produced using a physical blowing agent. To this end, any of a wide variety of polyolefins can be used. Thus, the term "polyolefin" as used herein includes any polymerized olefin and can be linear, branched, aliphatic, aromatic, substituted, and/or unsubstituted. Also included within the term "polyolefin" are homopolymers of olefin, copolymers of olefin, copolymers of an olefin and a non-ofefinic comonomer copolymerizable with the olefin (such as vinyl monomers, modified polymers thereof, and the like).

Thus, within the family of polyolefins, various polyethylene homopolymers and copolymers can be used, as well as polypropylene homopolymers and copolymers and high melt strength polypropylenes constructed through polymerization or irradiation techniques. For example, polyethylene homopolymers can include (but are not limited to) low density polyethylene (LDPE) and high density polyethylene (HDPE). Suitable polyethylene copolymers can include a wide variety of polymers, such as (but not limited to) ionomers, ethylene/vinyl acetate (EVA), ethylene vinyl alcohol (EVOH), and ethylene/alpha-olefins, including heterogeneous (Zeigler-Natta catalyzed) and homogenous (metallocene, single-site catalyzed) ethylene/alpha-olefin copolymers. Ethylene/alpha-olefin copolymers are copolymers are copolymers of ethylene with one or more comonomers selected from $C_3$ to $C_{20}$ alpha-olefins, such as 1-butene, 1-pentene, 1-hexene, 1-octene, methyl pentene, and the like, including linear low density polyethylene (LLDPE), linear medium density polyethylene (MDPE), very low density polyethylene (VLDPE), and ultra low density polyethylene (ULDPE). In some embodiments, suitable polyolefins can be derived from petroleum-based resources and/or emerging bio-based resources.

As set forth in more detail herein, the presently disclosed subject matter includes embodiments wherein the polyolefin is blended with an acrylated epoxidized fatty acid. Without being bound by any particular theory, it is believed that the presence of acrylated epoxidized fatty acid increases the solubility of the physical blowing agent, thereby improving miscibility in polyolefin (such as LDPE). It has been discovered that increasing the acrylated epoxidized fatty acid loading results in a greater decrease in enthalpy between foamed and unfoamed polyolefin. It is believed that this requires reduced activation energy for the nucleation of bubbles and cell growth due to increased mobility of the polymer chains due to a plasticizing effect. The combination of these effects appears to produce a large number of cells, thereby yielding lower foam densities.

In some embodiments, the polyolefin blend can comprise about 0.1% to about 9% by weight of the acrylated epoxidized fatty acid; in some embodiments, about 1% to about 7% by weight of the acrylated epoxidized fatty acid; and in some embodiments, from about 2% to about 5% by weight of the acrylated epoxidized fatty acid, based on the total weight of the blend. Thus, in some embodiments, the blend comprises about 0.1, 0.25, 0.5, 0.75, 1.0, 1.25, 1.5, 1.75, 2.0, 2.25, 2.5, 2.75, 3.0, 3.25, 3.5, 3.75, 4.0, 4.25, 4.5, 4.75, 5.0, 5.25, 5.5, 5.75, 6.0, 6.25, 6.5, 6.75, 7.0, 7.25, 7.5, 7.75, 8.0, 8.25, 8.5, 8.75, or 9.0% by weight of acrylated epoxidized fatty acid, based on the total weight of the blend.

Any of a wide variety of acrylated epoxidized fatty acids can be used in accordance with the presently disclosed subject matter. For example, in some embodiments, the acrylated epoxidized fatty acid can be selected from the following fatty acids: myristic acid, myristoleic acid, palmitic acid, palmitoleic acid, margaric acid, margaroleic acid, stearic acid, oleic acid, linoleic acid, linolenic acid, arachidic acid, gadoleic acid, eicosadienoic acid, behenic acid, erucic acid, lignoceric acid and combinations thereof. Such fatty acids can be found in vegetable oils including (but not limited to) linseed oil, tung oil, safflower oil, soybean oil, castor oil, cottonseed oil, peanut oil, rapeseed oil, coconut oil, palm oil, olive oil, corn oil, corn germ oil, sesame oil, peach seed oil, peanut oil, soybean lecithin, and egg yolk lecithin. One of ordinary skill in the art would recognize that the above list is not limiting.

Thus, any of a wide variety of acrylated epoxidized fatty acids can be used in accordance with the presently disclosed subject matter. For example, acrylated epoxidized soybean oil (AESO) compounds are known in the art. These compounds and methods for their production are disclosed in U.S. Pat. Nos. 3,125,592 and 3,450,613, the entire content of which is hereby incorporated by reference. One example of a commercially available AESO compound is ACTOMER X70® (available from Union Carbide, Houston, Tex., United States of America).

If desired or necessary, various additives can be included within the polyolefin blend. For example, in some embodiments, it can be desirable to include a nucleating agent (e.g., zinc oxide, zirconium oxide, silica, talc, and the like) and/or an aging modifier (e.g., a fatty acid ester, a fatty acid amide, a hydroxyl amide, and the like). Other additives that can be included are pigments, colorants, fillers, stability control agents, antioxidants, flame retardants, stabilizers, fragrances, odor masking agents, antistatic agents, lubricants, foaming aids, coloring agents, deterioration inhibitors, and the like. Such additives are believed to be well known to those of ordinary skill in the art.

The disclosed foam can have any desired thickness to suit the intended application. For example, in some embodiments, the disclosed foam can be in the form of a sheet or plank having a thickness ranging from about 1/32 inch to about 5 inches. However, thinner or thicker foams are also included within the scope of the presently disclosed subject matter.

The disclosed foam can have any desired density, such as (but not limited to) 9 pounds per cubic foot ("pcf") or less. Thus, in some embodiments, the disclosed foam can have a density ranging from about 0.1 to about 9 pcf; in some embodiments, from about 0.5 to about 8.5 pcf; in some embodiments, from about 0.75 to about 8 pcf; and in some embodiments, from about 1.0 to about 7.5 pcf.

The disclosed foam can be a closed cell foam. The term "closed cell" foam as used herein refers to foams comprising an open cell content of 30% volume or less, measured in accordance with ASTM D2856-94 (Procedure A). In some embodiments, the disclosed foam comprises no more than about any of the following amounts of open cell volume: 20%, 10%, 5%, 1% and 0%. Alternatively, in some embodiments, the disclosed foam can be an open cell foam. The term "open cell foam" as used herein refers to foams comprising an open cell content of greater than 30 volume %, measured in accordance with ASTM D2856, as set forth above. In some embodiments, the open cell foam includes an open cell volume of greater than about any of the following: 40%, 50%, 60%, or 90%.

In some embodiments, the disclosed foam can have an average cell size of at least about any of the following values: 0.01, 0.05, 0.1, 0.5, and 1.0 mm. In some embodiments, the disclosed foam can have an average cell size of at most about any of the following values: 10, 5, 3, 1, and 0.5 mm. The average cell size can be measured in accordance with ASTM D3576-98 (Procedure A).

The disclosed foam can take any of a wide variety of configurations, such as (but not limited to) sheets, plank, slabs, blocks, boards, rods, beads, and molded shapes.

IV. Methods of Making the Disclosed Foam

The disclosed foam can be constructed using any of a wide variety of processes known in the art. Regardless of which process used, any chemical or physical blowing agent can be used. Chemical foaming agents typically decompose at polymer melting conditions. For example, a sodium bicarbonate and citric acid mixture is commonly used to nucleate fine cells. Chemical foaming agents typically decompose between about 100° C. to about 140° C. to yield at least one gas (such as carbon dioxide) and water. In addition, solid particles can potentially act as nucleation sites. Once the nucleated bubble reaches a critical size, it grows continuously (due to gas diffusion inside the cells) until the bubble stabilizes to reach the final stage. A list of suitable chemical blowing agents can be found in Chapter 4 of *Thermoplastic Foams*, J. L. Throne, Sherwood Publishers (1996), the entire content of which is hereby incorporated by reference.

Alternatively, in some embodiments, the blowing agent can be a physical blowing agent. Physical blowing agents can be further classified into two categories—gases and volatile liquids. Such gaseous physical blowing agents can include (but are not limited to) carbon dioxide, nitrogen, argon, air, helium, hydrogen, xenon, sulfur hexafluoride, nitrous oxide, ammonia, silicon tetrafluoride, nitrogen tetrafluoride, boron tetrafluoride, boron trichloride, and combinations thereof. Thus, in some embodiments, the blowing agent can be carbon dioxide. Volatile liquid physical blowing agents can include (but are not limited to) liquids (such as water) and aliphatic or linear hydrocarbons (such as propane, isobutene, pentane, and their mixtures and chlorocarbons and chlorofluorohydrocarbons).

As would be apparent to those having ordinary skill in the art, blowing agents work by expanding a thermoplastic resin to produce a cellular thermoplastic structure having far less density than the resin from which the foam is made. Bubbles of gas form around "nucleation sites" and are expanded by heat or reduced pressure or by a process of chemical reaction in which a gas is evolved. A nucleation site is a small particle or conglomerate of small particles that promotes the formation of a gas bubble in the resin. Additives can be incorporated into the resin to promote nucleation for a particular blowing agent and, consequently, a more uniform pore distribution. However, the foam is maintained by replacing the blowing agent in the cells with air.

The total amount of blowing agent in the formulation used to prepare the disclosed foam structures depends on conditions such as the temperature and pressure under which the blowing agent is dissolved in the polymer, the chemical and thermophysical characteristics of the blowing agent used, and the desired density and associated properties (such as insulation value, weight-to-strength ratio, compressive strength, etc.) of the foamed article. Thus, in some embodiments, the blowing agent can be mixed with the polyolefin blend in any desired amount to achieve a desired degree of expansion in the resultant foam. For example, in some embodiments, the blowing agent can be added to the polyolefin blend in an amount ranging from about 0.5 to about 40 parts by weight; in some embodiments, from about 1 to 30 parts by weight; and in some embodiments, from about 3 to 15 parts by weight, based on 100 parts by weight of the polyolefin blend.

In some embodiments, the disclosed foam can be constructed using a continuous extrusion process. Particularly, in this method the polyolefin and acrylated epoxidized fatty acid are blended together and added to an extruder. Any conventional type of extruder can be used, e.g., single screw, double screw, and/or tandem extruders. In the extruder, the blend is melted and mixed. The blowing agent is added to the melted polyolefin blend through one or more injection ports in the extruder. Any additives that are to be used can be added to the melted polyolefin blend in the extruder and/or can be added with the resin pellets. The extruder pushes the entire melt mixture (melted polyolefin blend, blowing agent, and any additives) through a die at the end of the extruder and into a region of reduced temperature and pressure (relative to the temperature and pressure within the extruder). Any of a wide variety of dies can be used, including (but not limited to) strand, annular, flat, coextruded, and microlayered dies. In some embodiments, the region of reduced temperature and pressure can be the ambient atmosphere. The sudden pressure drop due to polymer filled with gas as it exits the die results in thermodynamic instability. The nucleating agents generate a large number of bubbles and grow due to the diffusion of vaporized gas into growing cells. The foam continues to expand until the cells grow and stabilize. The foam surface solidifies upon cooling of the polymer mass (due to the reduction in temperature), thereby trapping the blowing agent within the cells. An extruded foam is thereby formed.

Alternatively, in some embodiments, the disclosed foam can be constructed using a batch process. Specifically, the polyolefin blend and desired additives are added to a container, such as a pressure chamber. The container is heated to a specified temperature or temperature range sufficient enough to plasticize the polymer resin. The blowing agent is then added into the container to a specified pressure or pressure range, allowing the blowing agent to penetrate the resin over a period of time. The pressure is rapidly relieved, thereby allowing the resin to expand into a foam.

The presently disclosed subject matter also includes additional methods of foaming, including (but not limited to) solid state foaming, integral skin foaming, microcellular foaming, autoclave foaming, and semi-continuous foaming processes. Such methods are well known to those of ordinary skill in the foaming art.

Additional general information on the production of polyolefin and other foams is available in the text *Foam Extrusion*, edited and contributed to by Shau-Tarng Lee, Ph.D, and published in July 2000 by Technomics, Lancaster, Pa., United States of America, and also in *Polymeric Foams*, edited by S. T. Lee and N. S. Ramesh (2004) by CRC Press, Boca Raton, Fla., United States of America, both of which are incorporated herein by reference in their entireties for the purpose of general teachings.

V. Methods of Using the Disclosed Foam

As set forth herein, the presently disclosed methods can be used to construct a polyolefin foam (such as LDPE) using a physical blowing agent (such as carbon dioxide). Depending on the materials and process used, the resulting foam article can be a bead, sheet, board, plank, rods, tubes, contoured members, or the like. The disclosed foam can be used as such, cut into other shapes, further shaped or thermoformed by application of heat and/or pressure, or otherwise machined or formed into articles of desired size and shape, as would be well known to those of ordinary skill in the packaging art.

The disclosed foams can be used for any of a wide variety of purposes. For example, in some embodiments, the disclosed foam can be used for insulation, in various container and packaging systems, and/or as protective or flexible packaging. Thus, in some embodiments, the disclosed foam can be thermoformed into containers (such as, but not limited to, trays, bowls, and/or plates), used in flexible and rigid packaging, used in a variety of protective packaging applications, used in loose fill packaging, and/or can be molded as sheets, planks, boards, or contoured articles for flexible, protective, rigid, and/or insulative applications.

Other uses for the disclosed foams, as well as other processes, apparatus, equipment, devices and systems for the preparation thereof are described in U.S. Pat. Nos. 6,136,875; 5,149,473; 6,476,080; 6,599,946; 6,696,504; 2004/0132844; and 2004/0006149, the entire contents of which are hereby incorporated reference.

VI. Advantages of the Presently Disclosed Subject Matter

Polyethylene foams prepared from low density polyethylene resins ("LDPE" resins) have been widely accepted for industrial uses. However, it is well known that pure LDPE does not exhibit acceptable foaming behavior when a non-flammable physical blowing agent (such as carbon dioxide) is used. However, as set forth in detail herein above, it has been surprisingly found that when a polyolefin (such as LDPE) is blended with an acrylated epoxidized fatty acid, it can be foamed in the presence of a physical blowing agent (such as carbon dioxide).

In addition, the non-flammability of the physical blowing agent (such as carbon dioxide) allows for improved safety as compared to the use of flammable hydrocarbons. To this end, the use of a physical blowing agent also helps to reduce the curing time of the foam, which saves time, effort, and money.

EXAMPLES

The following Examples provide illustrative embodiments. In light of the present disclosure and the general level of skill in the art, those of ordinary skill in the art will appreciate that the following Examples are intended to be exemplary only and that numerous changes, modifications, and alterations can be employed without departing from the scope of the presently disclosed subject matter.

Example 1

Preparation of Samples 1, 2, and 3

Three formulations were compounded on a twin screw extruder equipped with a powder side stuffer feeder. Sample 1 was a 100% low density polyethylene formulation (Novapol LA-0124 grade resin with 1.5 melt index and density of about 0.9225 g/cc, available from Nova Chemicals, Moon Township, Pa., United States of America). Sample 2 was a 98% LDPE (Novapol LA-0124 grade resin) and 2% AESO (provided by the University of Delaware, Newark, Del., United States of America) formulation. Sample 3 was a 95% LDPE (Novapol LA-0124 grade resin) and 5% AESO (provided by the University of Delaware, Newark, Del., United States of America) formulation.

Samples 1, 2, and 3 were prepared by a continuous compounding and pelletizing operation. Specifically, a blend of each sample was placed in the hopper of a Brabender® counter-rotating, intermeshing, twin screw extruder, equipped with a strand die under the following conditions: temperature of 180° C. to 194° C.; pressure 90-120 psi; amperage 40-54; and screw RPM about 125. The resulting strand was fed through a water bath to cool and then dried with an air knife. The strand was then fed into a Killion® pelletizer.

Example 2

Foaming of Samples 1, 2, and 3

Samples 1, 2, and 3 from Example 1 were foamed in a batch process using the equipment setup of FIG. 1. Specifically, the samples were placed in metal container C housed in pressure chamber P. Carbon dioxide ("$CO_2$") was then released from tank T via channel X into the pressure chamber until the pressure reached 750 psi. The temperature was then increased from room temperature to 85° C., which caused the $CO_2$ to expand and increase the pressure within pressure chamber P to 1100 psi. Once the temperature reached 85° C., depressurization was immediately performed using depressurization valve D. The pressure chamber was opened when the vessel temperature reached room temperature. The weight of each foamed sample was then measured, as set forth below in Table 1. It was determined from Table 1 that there was no change in weight of the samples before and after foaming.

TABLE 1

Foaming of Samples 1, 2, 3

| Sample ID | Weight Before Foaming (g) | Weight After Foaming (g) |
|---|---|---|
| 1 | 1.23467 | 1.23441 |
| 2 | 0.95681 | 0.95613 |
| 3 | 0.74903 | 0.74885 |

Example 3

Differential Scanning Calorimetry of Samples 1, 2, 3

Differential Scanning calorimetry ("DSC") was performed on samples 1, 2, and 3 using a Perkin Elmer DSC 6 Instrument (available from Perkin Elmer, Waltham, Mass., United States of America). The samples were weighed and the calorimeter was then programmed for heating and cooling cycles. Particularly, each sample was initially kept at 20° C. for 5 minutes. The temperature was then increased to 130° C. at a rate of 10° C./minute. The sample was held at 130° C. for 10 minutes, and then decreased to 20° C. at a rate of 10° C./minute. The sample was held at 20° C. for 10 minutes and the temperature was then increased again to 130° C. at a rate of 10° C./minute. The temperature was held at 130° C. for 10 minutes and the sample was again cooled to 20° C. at a rate of 10° C./minute.

Figure 2:
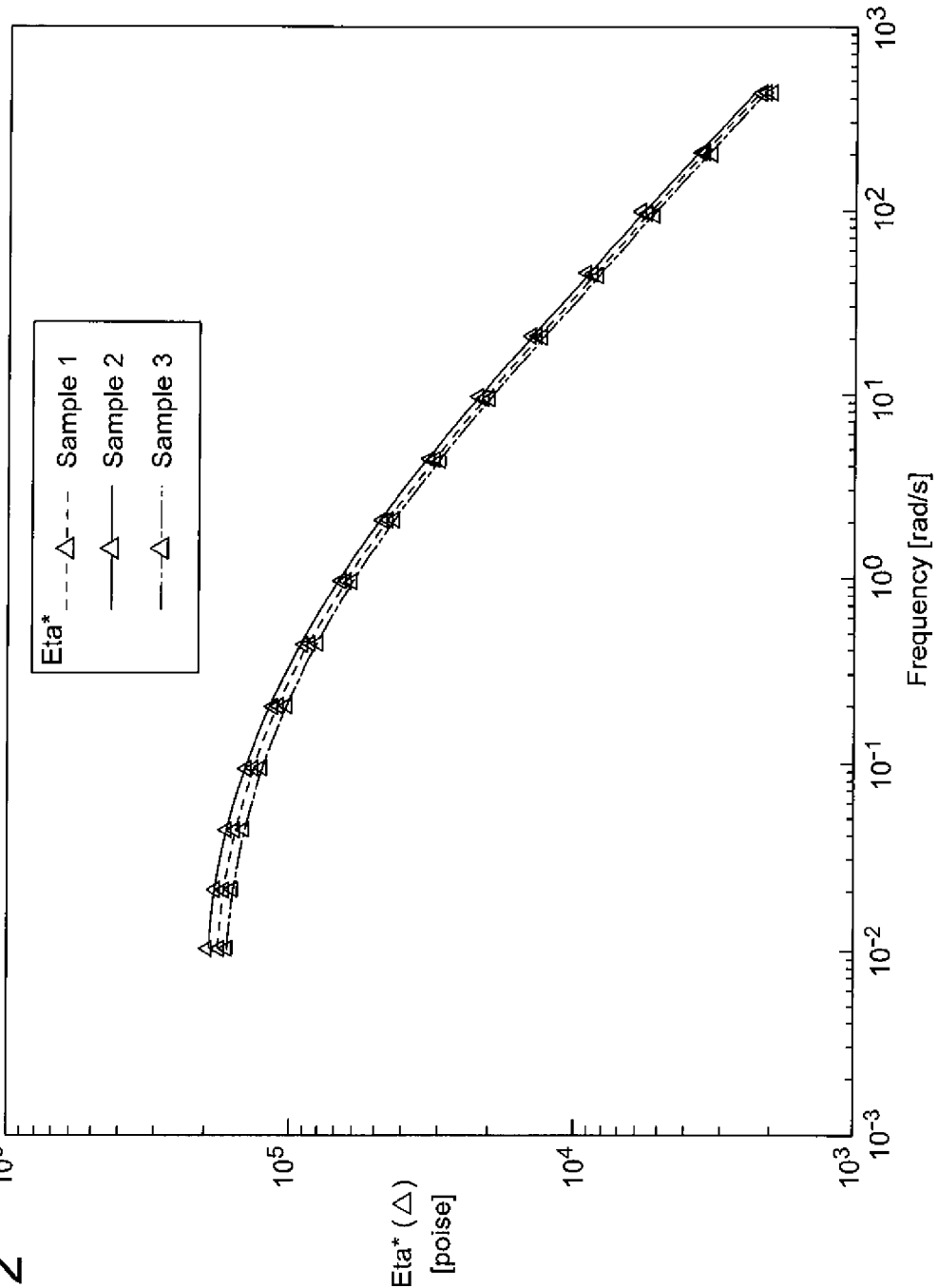
FIG. 2 is a line graph illustrating the melt rheology of LDPE, LDPE+2% AESO, and LDPE+5% AESO samples.

The melting temperature, heat of melting, area of melting, heat of recrystallization, and area of recrystallization for each sample was recorded and is set forth below in Table 2. The melt rheology of samples 1, 2, and 3 is shown in FIG. 2. The results indicate a minor increase in melt viscosity of sample 2 (LDPE+2% AESO) at very low shear rate. Otherwise, there were no changes in melt viscosity between samples 2 and 3 (LDPE+2% and 5% AESO).

Figure 3A:
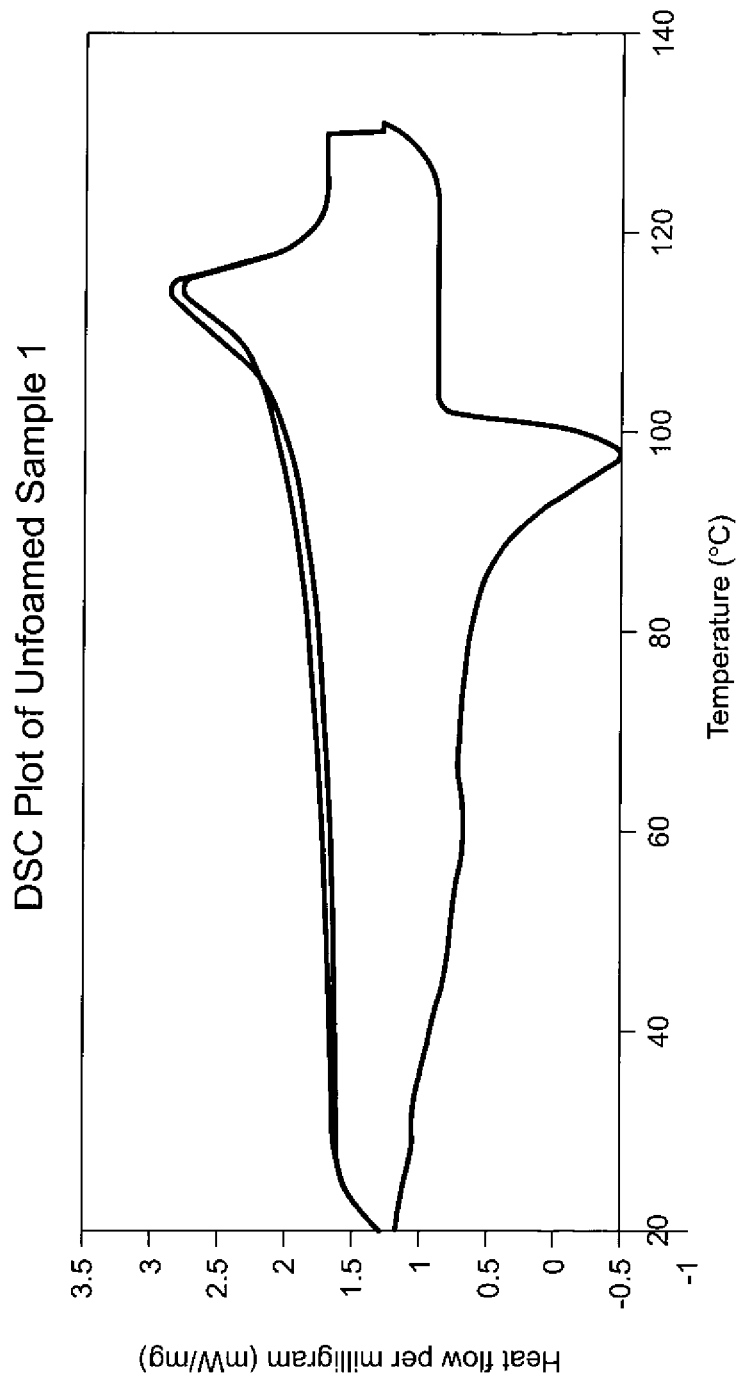
FIGS. 3a, 3c, and 3e are DSC plots of LDPE, LDPE+2% AESO, and LDPE+5% AESO unfoamed samples, respectively.
Figure 3B:
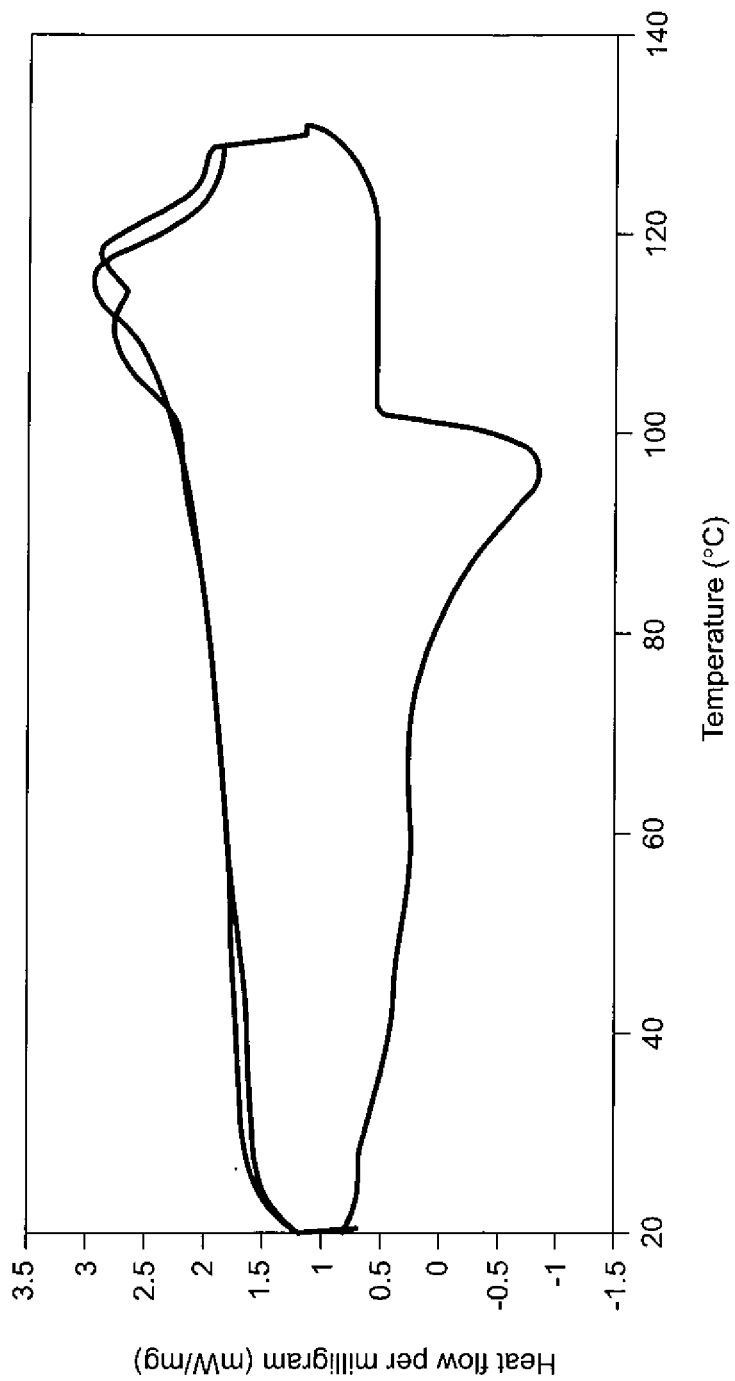
FIGS. 3b, 3d, and 3f are DSC plots of LDPE, LDPE+2% AESO, and LDPE+5% AESO foamed samples, respectively.
Figure 3C:
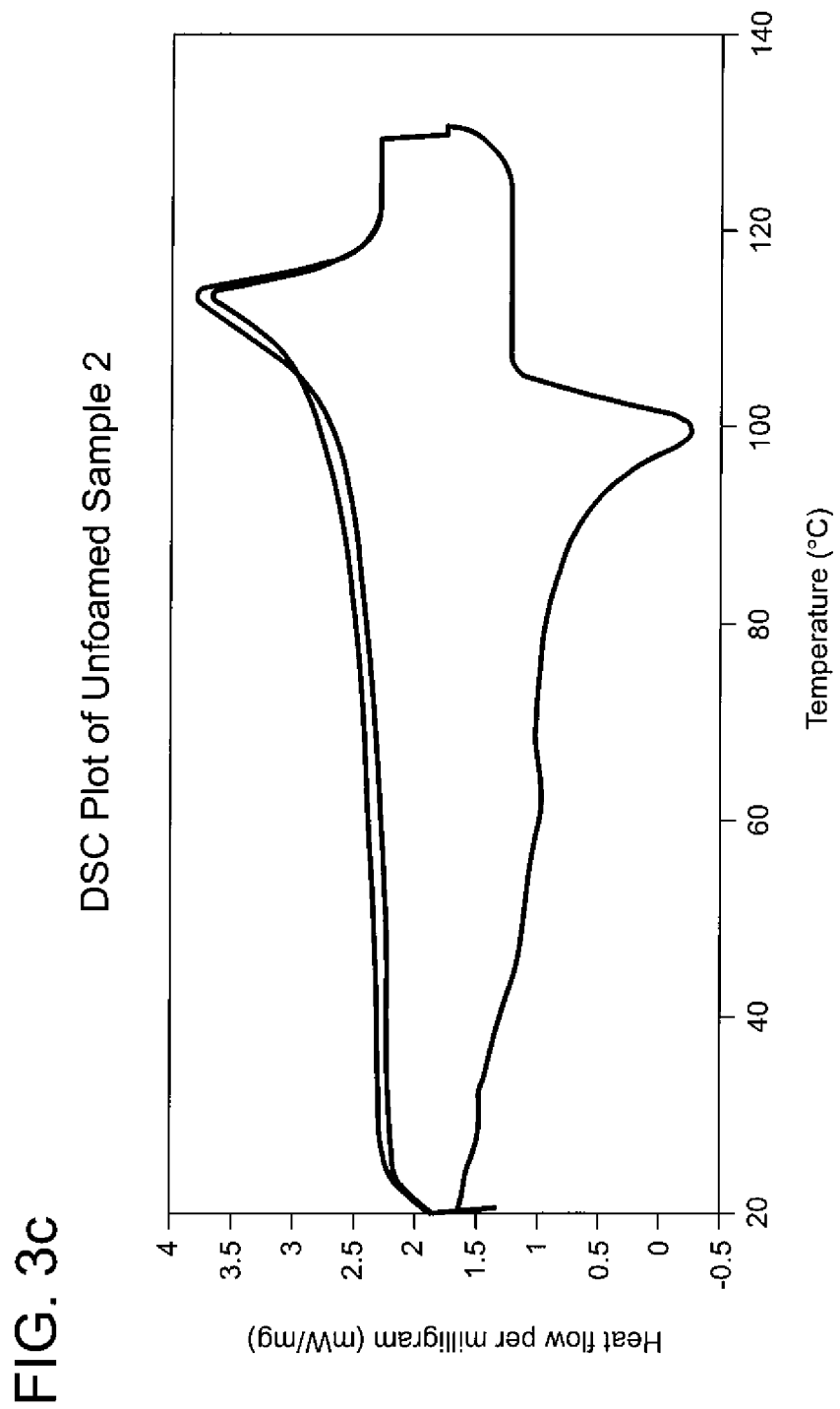
Figure 3D:
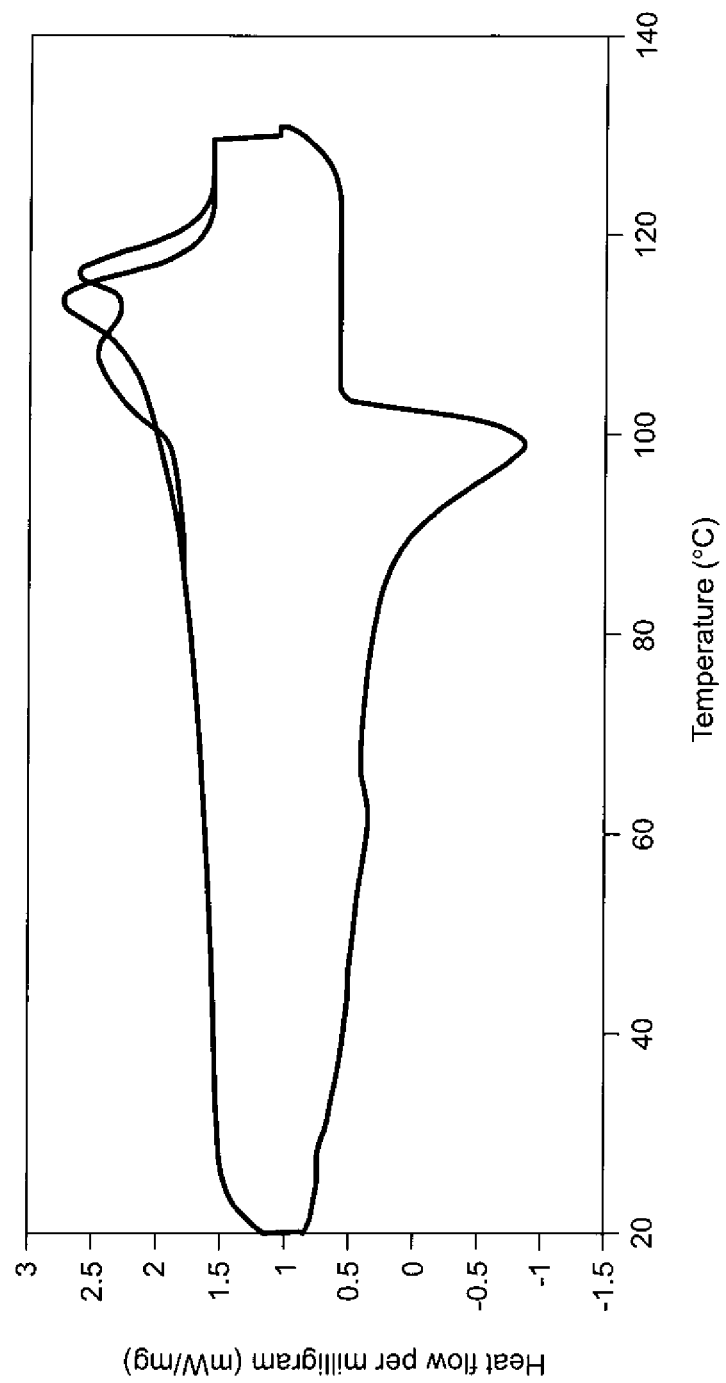
Figure 3E:
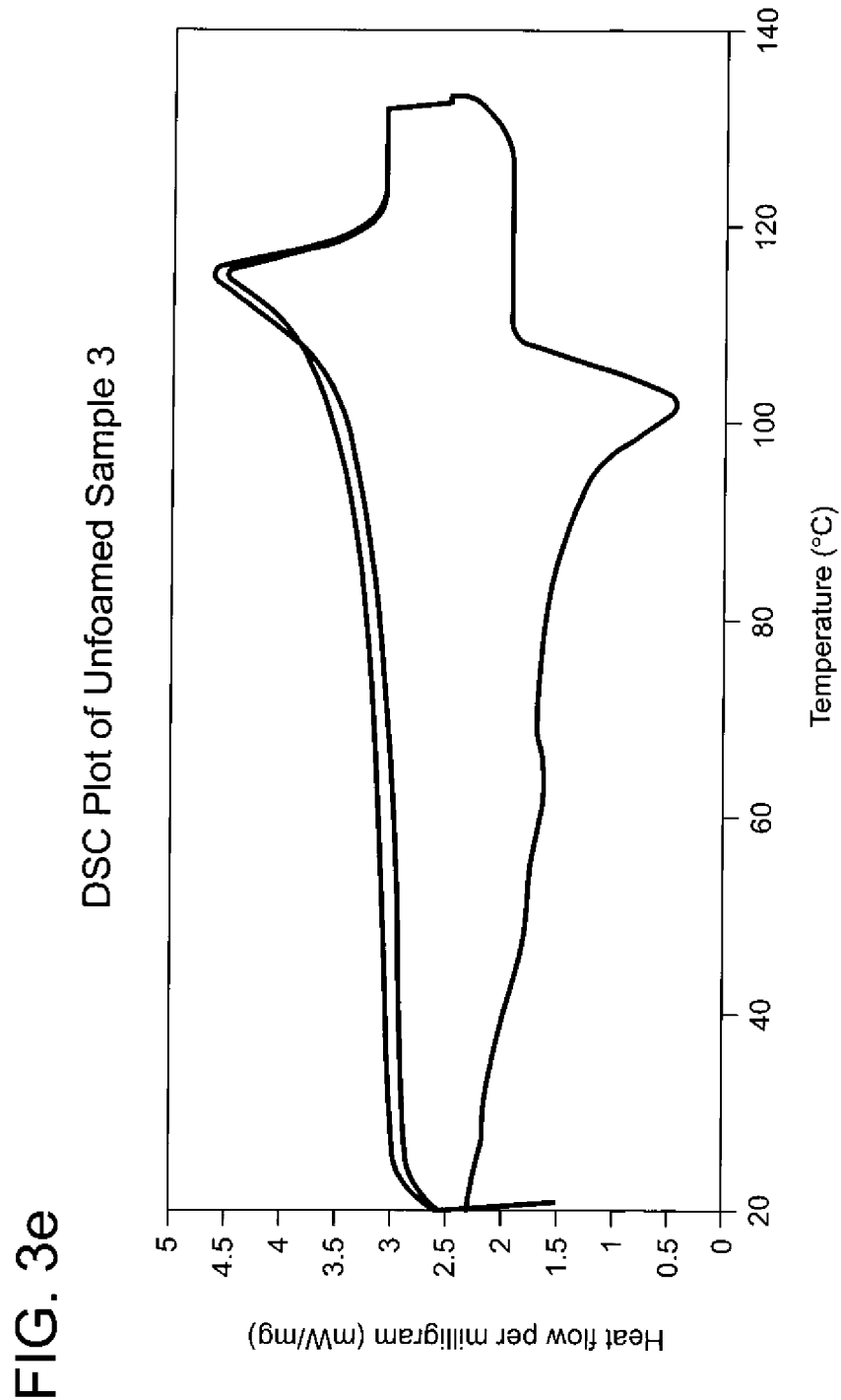
Figure 3F:
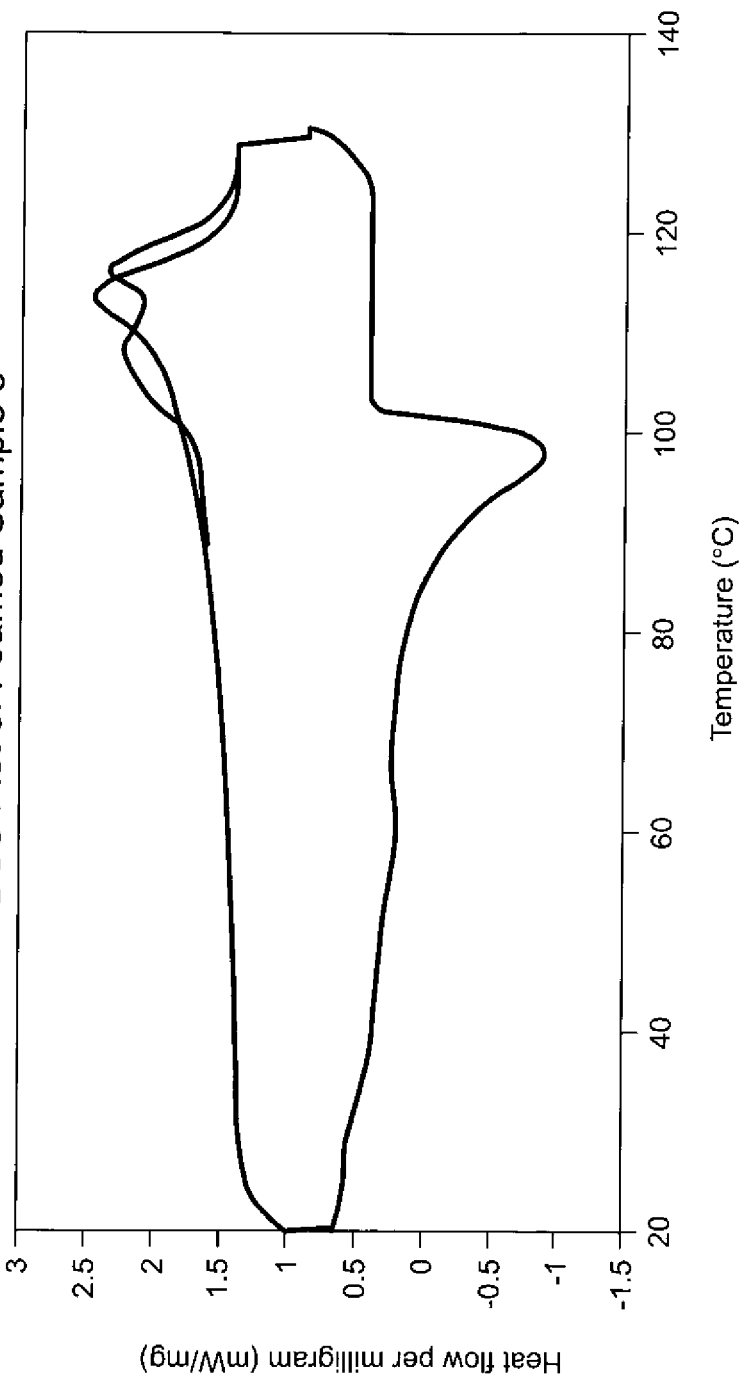
Figure 3G:
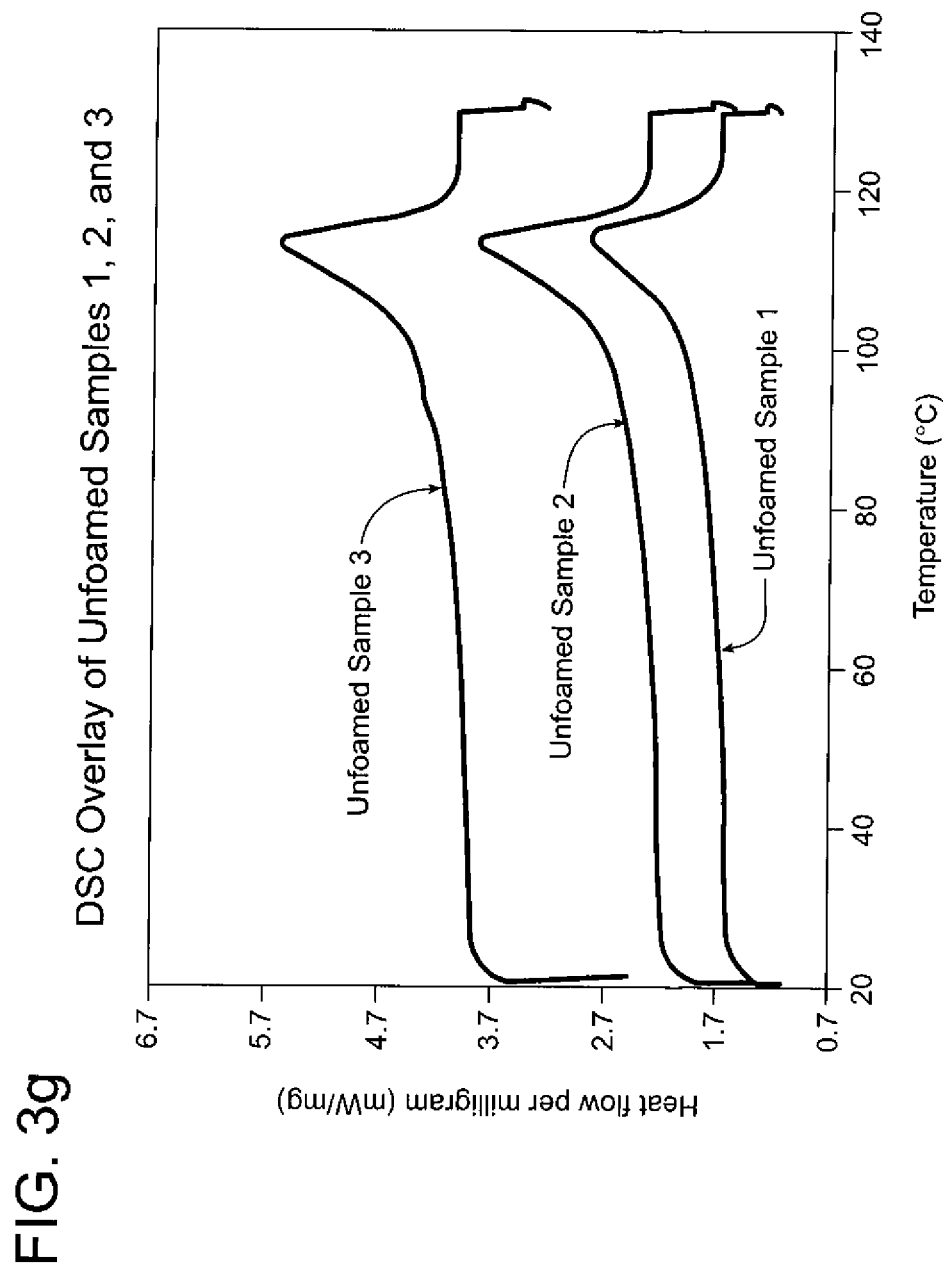
FIG. 3g is a DSC overlay of LDPE, LDPE+2% AESO, and LDPE+5% AESO unfoamed samples.
Figure 3H:
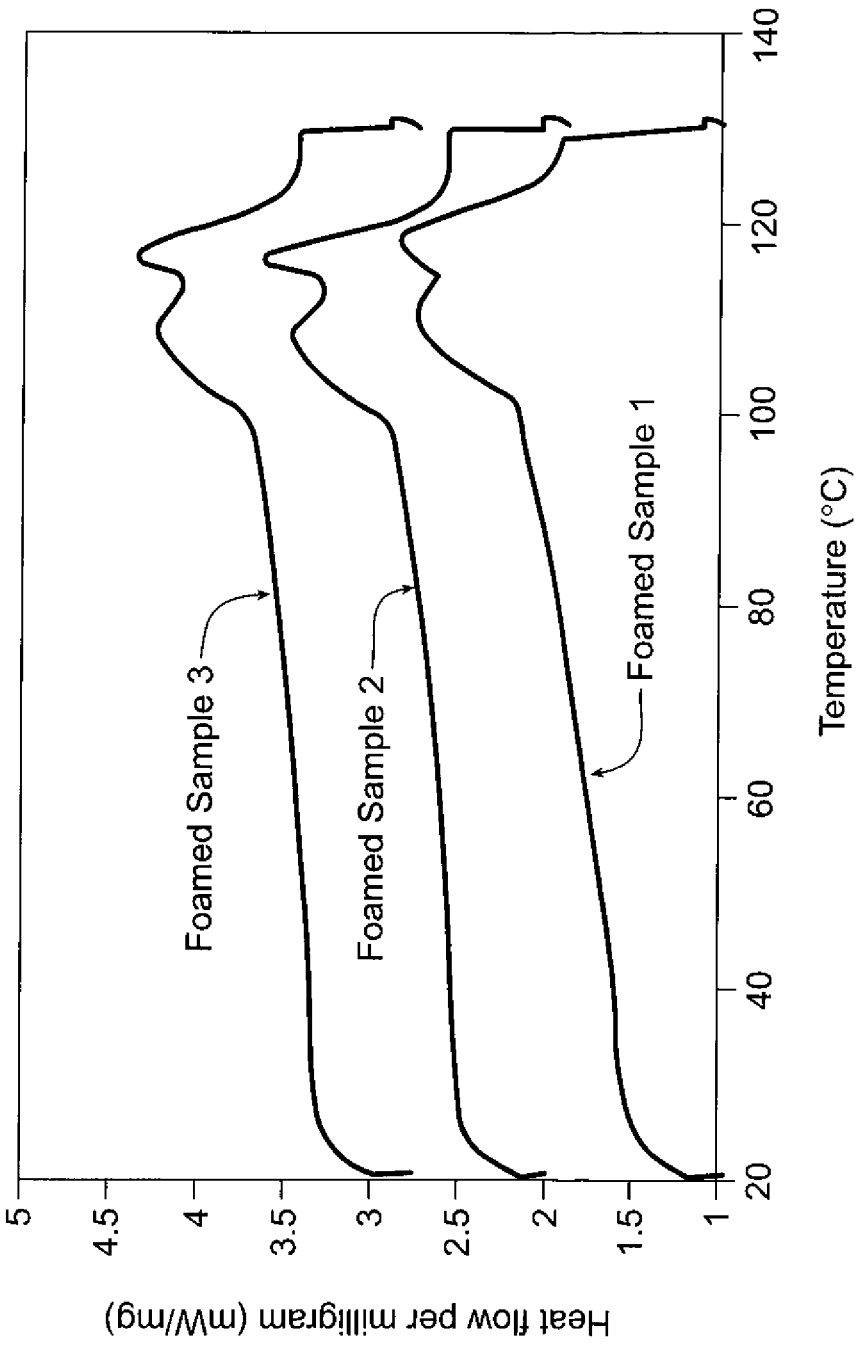
FIG. 3h is a DSC overlay of LDPE, LDPE+2% AESO, and LDPE+5% AESO foamed samples.
Figure 3I:
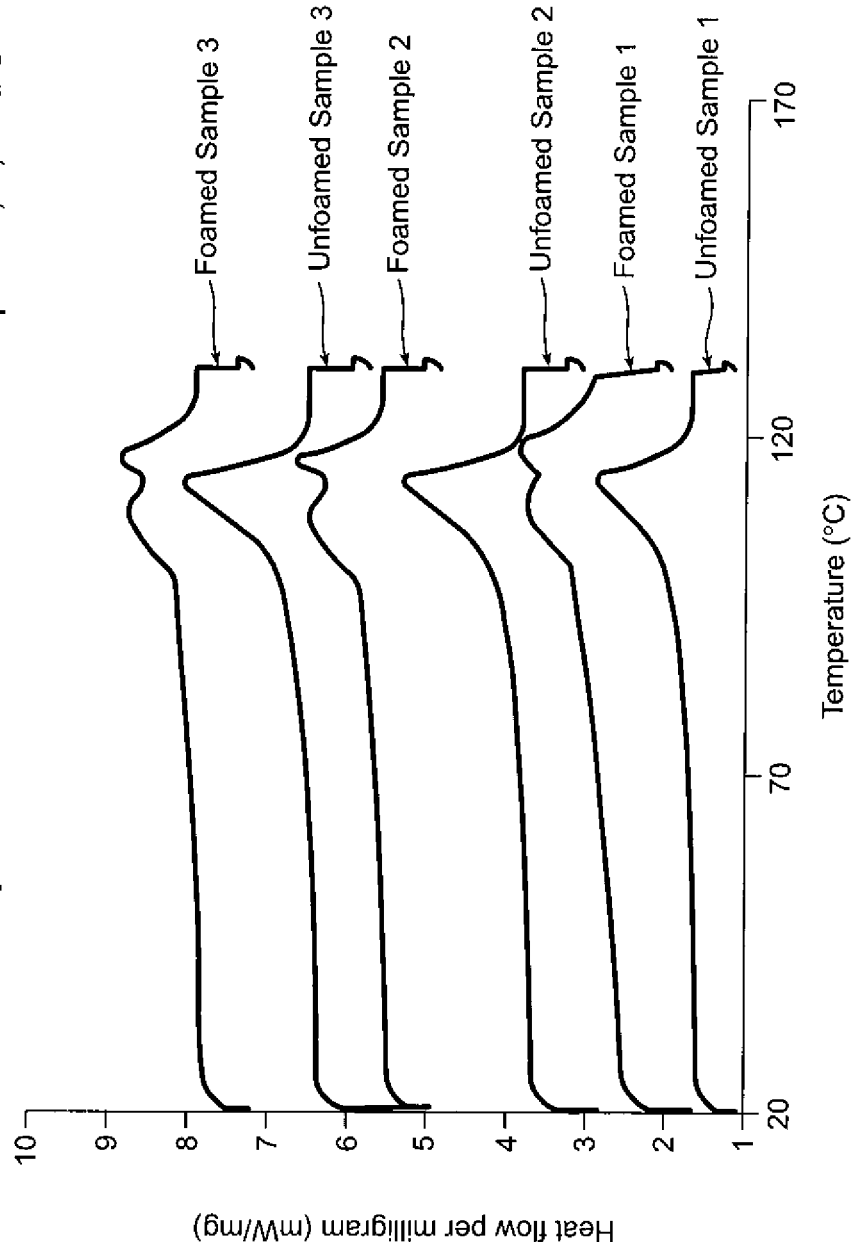
FIG. 3i is a DSC overlay of LDPE, LDPE+2% AESO, and LDPE+5% AESO unfoamed and foamed samples.
Figure 3J:
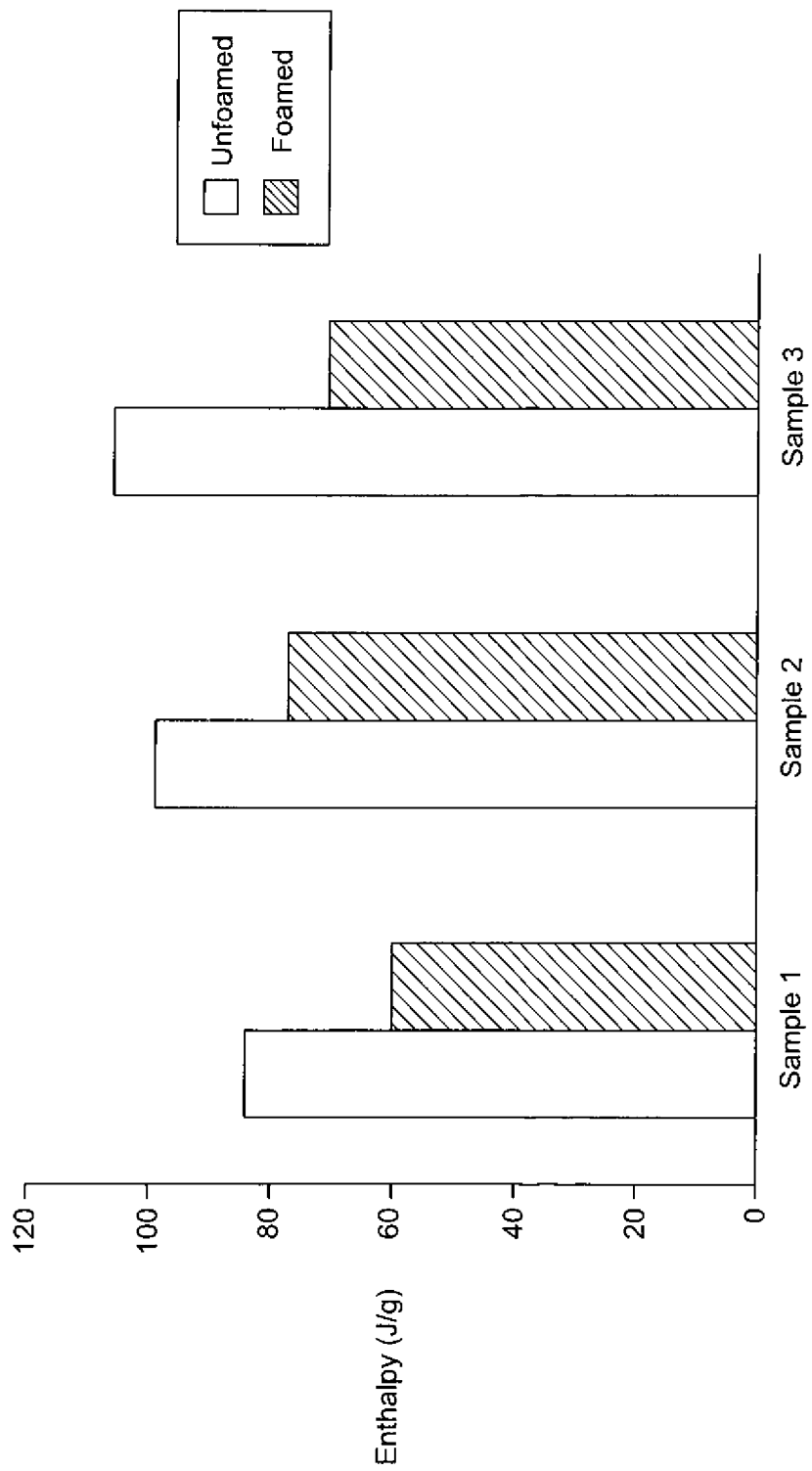
FIG. 3j is a bar graph illustrating the enthalpy of LDPE, LDPE+2% AESO, and LDPE+5% AESO unfoamed and foamed samples.
Figure 4C:
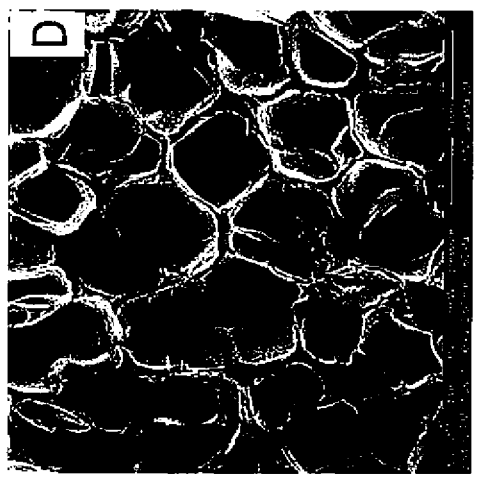
Figure 4D:
Figure 4F:
Figure 4E:

The DSC plots of unfoamed and foamed samples 1, 2, and 3 are illustrated in FIGS. 3a-3i. Specifically, FIGS. 3a and 3b illustrate the DSC plot of unfoamed and foamed sample 1, respectively. FIGS. 3c and 3d illustrate the DSC plot of unfoamed and foamed sample 2, respectively. FIGS. 3e and 3f illustrate the DSC plot of unfoamed and foamed sample 3, respectively. FIG. 3g depicts the DSC overlay of unfoamed samples 1, 2, and 3. FIG. 3h illustrates the DSC overlay of foamed samples 1, 2, and 3. FIG. 3i illustrates the DSC overlay of unfoamed and foamed samples 1, 2, and 3. FIG. 3j is a bar graph that depicts the drop in enthalpy of foamed and unfoamed samples 1, 2, and 3.

The DSC plots of the unfoamed and foamed samples show the basic difference of peaks during the first heating cycle, as illustrated in FIGS. 3a-3f. Unfoamed pure LDPE (sample 1) and LDPE+AESO (samples 2 and 3) show one peak, essentially indicating one melting point above which the polymer is completely in its melt form. FIG. 3j illustrates that the AESO additive increases the melting enthalpy of the LDPE and shows a modest effect on recrystallization of the LDPE (increasing recrystallization temperatures with concentration). The lack of effect on the melting temperature coupled with increased enthalpic values indicates that there is limited miscibility between the two. However, in the presence of supercritical carbon dioxide, these trends are affected. As shown in the figures, the enthalpy difference between the polymer and its foamed material shows similar differences for the pure LDPE (sample 1) and the LDPE+2% additive (sample 2). However, for LDPE+5% additive (sample 3), the decrease in foamed enthalpy is greater than that in its pure component, thereby indicating miscibility contributions to the compound when foamed.

TABLE 2

DSC Test Results

| Sample ID | $T_m^a$ (° C.) | Enthalpy ($\Delta H$) J/g | Crystallinity % | $T_c^b$ (° C.) | $T_d^c$ (° C.) |
|---|---|---|---|---|---|
| 1 | 112.4 | 122.6 | 41.8 | 96.9 | 469.2 |
| 2 | 112.3 | 124.6 | 42.5 | 97.0 | 486.3 |
| 3 | 112.5 | 108.0 | 36.8 | 96.7 | 486.8 |

$^a$Melting temperature
$^b$Heat of recrystallization
$^c$Onset of degradation in air Example 4

Foam Density Characterization of Samples 1, 2, 3

The polymer density ($p_f$) and foam density ($p_m$) were calculated according to ASTM D1505-98, the entire content of which is hereby incorporated by reference. The volume of water displaced by samples 1, 2, and 3 was measured and divided by its mass. Relative foam density ($p_r$) is the ratio of foam density to polymer density. Results are given below in Table 3.

TABLE 3

Summary of Foam Densities of Samples 1, 2, and 3

| Sample | $p_f^a$ (g/cc) | $p_m^b$ (g/cc) | $p_r^c$ |
|---|---|---|---|
| 1 | 0.955 | 0.956 | $1^d$ |
| 2 | 0.913 | 0.343 | 0.372 |
| 3 | 0.911 | 0.291 | 0.318 |

$^a$Polymer density
$^b$Foam density
$^c$Relative foam density
$^d$Did not foam

Example 5

Environmental Scanning Electron Microscopy of Samples 1, 2, and 3

A Quanta Environmental scanning electron microscope (available from FEI Company, Hillsboro, Oreg., United States of America) was used to measure the environmental scanning electron microscopy (ESEM) for samples 1, 2, and 3. The pressure was set to 60 Pa, the voltage of the electron beam was 10 KV, and the working distance was 8 mm. An Everhardt-Secondary Electron Detector was used to characterize foam cell morphology. The foams were cryo-fractured in liquid nitrogen and then mounted on the SEM mounts with carbon tape to avoid charge deposition.

The number of voids per cm³ of foam ($N_f$), the volume occupied by the voids in 1 cm³ of foam ($V_f$), and the number of voids nucleated per cm³ of original unfoamed polymer ($N_0$) were calculated by following the method suggested in V. Kumar, J. W., *Production of Microcellular Polycarbonate Using Carbon Dioxide for Bubble Nucleation*. Journal of Engineering for Industry, November 1994, Vol. 116/413, the entire content of which is hereby incorporated by reference.

A summary of the cell characterization is shown below in Table 4. The ESEM of samples 1, 2, and 3 is given in FIG. 4 (A, B, and C correspond to the ESEM of sample 2; D, E, and F correspond to sample 3). As illustrated in Tables 3 and 4 and FIGS. 2 and 3, pure LDPE (Sample 1) did not foam well, but blends of LDPE and AESO foamed well. The increase in AESO content resulted in uniform foam cell size, as evident in FIG. 4. Also, it can be seen that as the amount of foaming agent (AESO) increased, the cell size increased, resulting in low cell density. The void fraction also increased as foaming agent increased.

TABLE 4

Cell Characterization of Samples 1, 2, and 3

| Sample | $D^a$ (mm) | $N_o^b$ (cells/cm³) | $V_f^c$ (%) |
|---|---|---|---|
| 1 | 0 | 0 | 0 |
| 2 | 0.102 | 307338 | 14.58 |
| 3 | 0.5 | 25159 | 62.2 |

$^a$Average cell diameter
$^b$Cell density
$^c$Void fraction

CONCLUSIONS

Pure LDPE does not achieve good foaming characteristics with supercritical carbon dioxide. However, when compounded with 2% and 5% AESO, good foaming was achieved due to improved nucleation of cells and foam growth characteristics. The cell density of the foam decreased with increasing amounts of AESO, and the void fraction also showed an increase from 14.58 to 62.2%.

What is claimed is:

1. A method of constructing a polyolefin foam, said method comprising:
   a. blending (1) about 91-99.9% polyolefin and (2) about 0.1-9% acrylated epoxidized fatty acid, said weight percentages being based on the total amount of (1) and (2) in the blend;
   b. mixing a physical blowing agent with the blend of step (a); and
   c. causing the blowing agent to expand within the mixture of step (b), thereby forming a foam;
   wherein said foam has a density of 0.1 to 9 pounds per cubic foot.

2. The method of claim 1, wherein said polyolefin is selected from the group comprising: low density polyethylene, high density polyethylene, and ethylene/alpha olefin copolymer.

3. The method of claim 1, wherein said polyolefin is low density polyethylene.

4. The method of claim 1, wherein said polyolefin blend comprises about (1) 98-95% polyolefin and about (2) 2-5% acrylated epoxidized fatty acid, said weight percentages being based on the total amount of (1) and (2) in the blend.

5. The method of claim 1, wherein said fatty acid is selected from the group comprising: linseed oil, tung oil, safflower oil, soybean oil, castor oil, cottonseed oil, peanut oil, rapeseed oil, coconut oil, palm oil, olive oil, corn oil, corn germ oil, sesame oil, peach seed oil, peanut oil, soybean lecithin, egg yolk lecithin, and combinations thereof.

6. The method of claim 1, wherein said acrylated epoxidized fatty acid is acrylated epoxidized soybean oil.

7. The method of claim 1, wherein said physical blowing agent is selected from the group comprising: carbon dioxide, nitrogen, argon, water, air, nitrogen, helium, xenon, sulfur hexafluoride, nitrous oxide, ammonia, silicon tetrafluoride, nitrogen tetrafluoride, boron tetrafluoride, boron trichloride, and combinations thereof.

8. The method of claim 1, wherein said physical blowing agent is carbon dioxide.

9. A polyolefin foam produced by the method of claim 1.

10. A foam comprising a blend of:
    a. about 91-99.9% polyolefin; and
    b. about 0.1-9% acrylated epoxidized fatty acid, said weight percentages being based on the total amount of (a) and (b) in the blend.

11. The foam of claim 10, wherein said polyolefin is selected from the group comprising: low density polyethylene, high density polyethylene, and ethylene/alpha olefin copolymer.

12. The foam of claim 10, wherein said polyolefin is low density polyethylene.

13. The foam of claim 10, wherein said polyolefin blend comprises about (1) 98-95% polyolefin and about (2) 2-5% acrylated epoxidized fatty acid, said weight percentages being based on the total amount of (1) and (2) in the blend.

14. The foam of claim 10, wherein said fatty acid is selected from the group comprising: linseed oil, tung oil, safflower oil, soybean oil, castor oil, cottonseed oil, peanut oil, rapeseed oil, coconut oil, palm oil, olive oil, corn oil, corn germ oil, sesame oil, peach seed oil, peanut oil, soybean lecithin, egg yolk lecithin, and combinations thereof.

15. The foam of claim 10, wherein said acrylated epoxidized fatty acid is acrylated epoxidized soybean oil.

* * * * *